US 9,411,715 B2

(12) United States Patent
Susnea et al.

(10) Patent No.: US 9,411,715 B2
(45) Date of Patent: Aug. 9, 2016

(54) SYSTEM, METHOD, AND COMPUTER PROGRAM PRODUCT FOR OPTIMIZING THE MANAGEMENT OF THREAD STACK MEMORY

(71) Applicant: NVIDIA Corporation, Santa Clara, CA (US)

(72) Inventors: Adriana Maria Susnea, Bellevue, WA (US); Vinod Grover, Mercer Island, WA (US); Sean Youngsung Lee, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 4 days.

(21) Appl. No.: 13/712,897

(22) Filed: Dec. 12, 2012

(65) Prior Publication Data

US 2014/0164727 A1 Jun. 12, 2014

(51) Int. Cl.
*G06F 9/45* (2006.01)
*G06F 12/02* (2006.01)

(52) U.S. Cl.
CPC .............. *G06F 12/023* (2013.01); *G06F 8/434* (2013.01); *G06F 8/443* (2013.01)

(58) Field of Classification Search
None
See application file for complete search history.

(56) References Cited

U.S. PATENT DOCUMENTS

| | | | | |
|---|---|---|---|---|
| 5,487,158 A * | 1/1996 | Amelina et al. | | 717/136 |
| 5,561,803 A * | 10/1996 | Kilis | | G06F 8/48 717/159 |
| 5,774,730 A * | 6/1998 | Aizikowitz et al. | | 717/157 |
| 5,923,883 A * | 7/1999 | Tanaka | | G06F 8/443 717/159 |
| 5,978,588 A * | 11/1999 | Wallace | | 717/159 |
| 6,070,010 A * | 5/2000 | Keenleyside et al. | | 717/154 |
| 6,091,897 A * | 7/2000 | Yates et al. | | 717/138 |
| 6,226,789 B1 * | 5/2001 | Tye et al. | | 717/138 |
| 6,434,743 B1 * | 8/2002 | Click et al. | | 717/157 |
| 6,505,344 B1 * | 1/2003 | Blais | | G06F 9/4428 717/151 |
| 6,675,378 B1 * | 1/2004 | Schmidt | | G06F 8/441 717/154 |
| 6,735,761 B1 * | 5/2004 | Ogasawara | | G06F 9/45516 717/151 |
| 6,922,824 B2 * | 7/2005 | Swetland | | G06F 8/443 717/159 |

(Continued)

FOREIGN PATENT DOCUMENTS

| | | |
|---|---|---|
| TW | 200519595 | 6/2005 |
| TW | I312112 B | 7/2009 |
| WO | 2012134557 A1 | 10/2012 |

OTHER PUBLICATIONS

Kim, et al., "A Dynamic Stack Allocating Method in Multi-Threaded Operating Systems for Wireless Sensor Network Platforms"; 2007 IEEE; [retrieved on Oct. 1, 2014]; Retrieved from Internet <URL: http://ieeexplore.ieee.org/stamp/stamp.jsp!tp=&arnumber=4382142&tag=1>; pp. 1-6.*

(Continued)

*Primary Examiner* — Xi D Chen
(74) *Attorney, Agent, or Firm* — Zilka-Kotab, PC

(57) ABSTRACT

A system, method, and computer program product for optimizing thread stack memory allocation is disclosed. The method includes the steps of receiving source code for a program, translating the source code into an intermediate representation, analyzing the intermediate representation to identify at least two objects that could use a first allocated memory space in a thread stack memory, and modifying the intermediate representation by replacing references to a first object of the at least two objects with a reference to a second object of the at least two objects.

17 Claims, 9 Drawing Sheets

(56) References Cited

U.S. PATENT DOCUMENTS

| | | | | |
|---|---|---|---|---|
| 7,028,286 | B2* | 4/2006 | Larin | G06F 8/447 717/159 |
| 7,302,515 | B1* | 11/2007 | Detlefs | G06F 12/0276 717/151 |
| 7,681,187 | B2* | 3/2010 | Ludwig et al. | 717/151 |
| 7,810,085 | B2* | 10/2010 | Shinnar et al. | 717/156 |
| 7,882,315 | B2 | 2/2011 | Tsai et al. | |
| 8,037,465 | B2* | 10/2011 | Tian et al. | 717/158 |
| 8,117,605 | B2* | 2/2012 | Lev | G06F 9/466 717/159 |
| 8,166,450 | B2* | 4/2012 | Fuhler et al. | 717/101 |
| 8,237,726 | B2* | 8/2012 | Chen et al. | 345/559 |
| 8,516,462 | B2* | 8/2013 | Dewitt, Jr. | G06F 9/5016 717/151 |
| 2004/0015931 | A1* | 1/2004 | Larin | G06F 8/447 717/154 |
| 2004/0216097 | A1* | 10/2004 | Sun | G06F 12/121 717/154 |
| 2005/0166195 | A1* | 7/2005 | Kawahito | G06F 8/443 717/154 |
| 2005/0289322 | A1* | 12/2005 | Peri et al. | 712/26 |
| 2007/0156985 | A1 | 7/2007 | Tsai et al. | |
| 2010/0042981 | A1* | 2/2010 | Dreyer et al. | 717/146 |
| 2010/0153911 | A1* | 6/2010 | Porras et al. | 717/106 |
| 2010/0229159 | A1* | 9/2010 | Odaira et al. | 717/128 |
| 2011/0099542 | A1* | 4/2011 | Branda | G06F 11/301 717/154 |
| 2012/0030661 | A1* | 2/2012 | Porras et al. | 717/153 |
| 2012/0204163 | A1* | 8/2012 | Marathe | G06F 8/4442 717/151 |
| 2013/0031536 | A1* | 1/2013 | De et al. | 717/146 |
| 2013/0141443 | A1* | 6/2013 | Schmit et al. | 345/505 |
| 2013/0198494 | A1* | 8/2013 | Grover et al. | 712/226 |
| 2013/0263116 | A1* | 10/2013 | Haupt et al. | 718/1 |

OTHER PUBLICATIONS

Gergov, "Algorithms for Compile-Time Memory Optimization"; SODA '99 Proceedings of the tenth annual ACM-SIAM symposium on Discrete algorithms; [retrieved on Feb. 13, 2015]; Retrieved from Internet <URL:http://dl.acm.org/citation.cfm?id=315082>; pp. S907-S908.*

Gheorghioiu, et al., "Interprocedural Compatibility Analysis for Static Object Preallocation"; 2003, ACM; [retrieved on Feb. 13, 2015]; Retrieved from Internet <URL:http://citeseerx.ist.psu.edu/viewdoc/download?doi=10.1.1.13.4030&rep=rep1&tyep=pdf>; pp. 1-12.*

Bouchebaba, et al., "MPSoC Memory Optimization Using Program Transformation"; 2007 ACM; [retrieved on Mar. 23, 2016]; Retrieved from Internet <URL:http://dl.acm.org/citation.cfm?id=1278356>;pp. 43:1-43:39.*

Laurenzano, et al., "Protean Code: Achieving Near-free Online Code Transformations for Warehouse Scale Computers"; 2014 IEEE;[retrieved on Mar. 23, 2016]; Retrieved from Internet <URL:http://dl.acm.org/citation.cfm?id=2742212>;pp. 558-570.*

Foster, et al., "Performance Tuning Mboile Agent Workflow Applications"; 1999 Technology of Object-Oriented Languages and Systems (TOOLS) 30; [retrieved on Mar. 23, 2016]; Retrieved from Internet <URL:http://ieeexplore.ieee.org/stamp/stamp.jsp?tp=&arnumber=787531>pp. 1-10.*

Kim, et al., "Energy-efficient Java execution using local memory and object co-location"; 2004 IEE; Retreived from Internet <URL:http://ieeexplore.ieee.org/stamp/stamp.jsp?tp=&arnumber=1269634>pp. 33-42.*

Notice of Allowance from Taiwan Patent Application No. 102140654, dated Jul. 22, 2015.

Office Action from Taiwan Patent Application No. 102140654, dated Mar. 11, 2015.

* cited by examiner

```
Program 201

1     #define N 2000
2
3     extern "C" int g(int n, int m, int k)
4     {
5
6         int A[N], B[N], C[N];
7         int result = 0;
8
9         if (n < m) {
10            for (int i = 0; i < N; i++) {
11                A[i] = i*3;
12            }
13            for (int i = 0; i < N; i++) {
14                if (i % k) result += A[i];
15            }
16        } else {
17            for (int i = 0; i < N; i++) {
18                B[i] = i*2;
19            }
20            for (int i = 0; i < N; i++) {
21                C[i] = i*i;
22            }
23            for (int i = 0; i < N; i++) {
24                if (i % k == 0) result += B[i]*C[i];
25            }
26        }
27
28        return result;
29    }
```

1       A := alloc(int, 2000)
2       B := alloc(int, 2000)
3       C := alloc(int, 2000)
4       result := alloc(int, 1)
5       result := 0
6       if n >= m goto L5
7       i := 0
8   L1  if i >= 2000 goto L2
9       t0 := i * 3
10      t1 := &A
11      t2 := t1 + i
12      *t2 := t0
13      i := i + 1
14      goto L1
15  L2  i := 0
16  L3  if i >= 2000 goto L12
17      t0 := i % k
18      if t0 == 0 goto L4
19      t0 := &A
20      t1 := t0 + i
21      result := result + *t1
22  L4  i := i + 1
23      goto L3
24  L5  i := 0
25  L6  if i >= 2000 goto L7
26      t0 := i * 2
27      t1 := &B
28      t2 := t1 + i
29      *t2 := t0
30      i := i + 1
31      goto L6
32  L7  i := 0
33  L8  if i >= 2000 goto L9
34      t0 := i * i
35      t1 := &C
36      t2 := t1 + i
37      *t2 := t0
38      i := i + 1
39      goto L8
40  L9  i := 0
41  L10 if i >= 2000 goto L12
42      t0 := i % k
43      if t0 > 0 goto L11
44      t0 := &B
45      t1 := t0 + i
46      t2 := &C
47      t3 := t2 + i
48      t4 := *t1 * *t2
49      result := result + t4
50  L11 i := i + 1
51      goto L10
52  L12 return result
```

1              A := alloc(int, 2000)
2              B := alloc(int, 2000)
3              result := alloc(int, 1)
4              result := 0
5              if n >= m goto L5
6              i := 0
7      L1     if i >= 2000 goto L2
8              t0 := i * 3
9              t1 := &A
10             t2 := t1 + i
11             *t2 := t0
12             i := i + 1
13             goto L1
14     L2     i := 0
15     L3     if i >= 2000 goto L12
16             t0 := i % k
17             if t0 == 0 goto L4
18             t0 := &A
19             t1 := t0 + i
20             result := result + *t1
21     L4     i := i + 1
22             goto L3
23     L5     i := 0
24     L6     if i >= 2000 goto L7
25             t0 := i * 2
26             t1 := &A
27             t2 := t1 + i
28             *t2 := t0
29             i := i + 1
30             goto L6
31     L7     i := 0
32     L8     if i >= 2000 goto L9
33             t0 := i * i
34             t1 := &B
35             t2 := t1 + i
36             *t2 := t0
37             i := i + 1
38             goto L8
39     L9     i := 0
40     L10    if i >= 2000 goto L12
41             t0 := i % k
42             if t0 > 0 goto L11
43             t0 := &A
44             t1 := t0 + i
45             t2 := &B
46             t3 := t2 + i
47             t4 := *t1 * *t2
48             result := result + t4
49     L11    i := i + 1
50             goto L10
51     L12    return result
```

SYSTEM, METHOD, AND COMPUTER PROGRAM PRODUCT FOR OPTIMIZING THE MANAGEMENT OF THREAD STACK MEMORY

FIELD OF THE INVENTION

The present invention relates to compilers, and more particularly to optimizations in memory allocation.

BACKGROUND

Local memory available for execution of a program is an important resource in a system architecture. Proper management of that resource is crucial to efficient execution of the program. Ideally, during execution of the program, only memory that includes data for current instructions and future instructions is allocated, while any memory containing data used in previously executed instructions is deallocated and returned to a free memory pool. Certain memory may be managed by a programmer, such as by using the malloc and free instructions in a program written in C++, in order to allocate and free blocks of memory explicitly.

However, in the case of a thread stack memory (i.e., a portion of memory allocated to a program thread that acts as a last-in, first-out (LIFO) queue), the programmer typically does not manage the thread stack memory. Instead, the thread stack memory is allocated dynamically as the program executes. Current compilers do not often address optimizations for efficient management of the thread stack memory. Thus, there is a need for addressing this issue and/or other issues associated with the prior art.

SUMMARY

A system, method, and computer program product for optimizing thread stack memory allocation is disclosed. The method includes the steps of receiving source code for a program, translating the source code into an intermediate representation, analyzing the intermediate representation to identify at least two objects that could use a first allocated memory space in a thread stack memory, and modifying the intermediate representation by replacing references to a first object of the at least two objects with a reference to a second object of the at least two objects.

BRIEF DESCRIPTION OF THE DRAWINGS

FIG. 3A illustrates source code for an example program, in accordance with one embodiment;

FIG. 3B illustrates the intermediate representation corresponding to the example program of FIG. 3A, in accordance with one embodiment;

FIG. 3C illustrates an intermediate representation that is a modified version of the intermediate representation of FIG. 3B, in accordance with one embodiment;

DETAILED DESCRIPTION

Some conventional compilers optimize allocation of registers by performing data-flow analyses and ordering program instructions in a manner such that certain registers can be reused to store different values at different times in the program execution. A compiler typically translates the source code (e.g., a program written in a high-level language such as C++) into an intermediate representation (IR), which is a data structure that represents the meaning (including the execution order) of the program. The IR may be an intermediate language for an abstract machine. The IR enables the compiler to perform data-flow analysis and rearrange the order of the program before generating the machine-code to be executed by a processor.

The optimizations described above in connection with register allocation cannot be applied in the same way to larger memory structures in the thread stack. The objects allocated in the thread stack may be variable in size. In contrast, registers have a well-defined size, such as 32 bits. When a value is stored in a register by an instruction included in a program, the value necessarily overwrites all data previously allocated to that register. Objects in the thread stack memory behave differently. When a value is stored in an element of an object, such as one entry of an array, the value overwrites the data that was previously stored in that entry. However, the other entries of the object may still be valid and allocated to the data that was previously stored in the object. A data-flow analysis that attempted to track every entry in the thread stack would become very complex and the optimizations that would be able to be achieved may not be effective.

The algorithm described below performs a different type of data-flow analysis that tracks whether objects allocated to the thread stack memory (i.e., stack allocated objects) are "live" in different parts of the program. The following definitions are used throughout the present disclosure. In the context of the present description, an object is live at a certain point (i.e., instruction) in the program if the data that is stored in the object is potentially needed by the current instruction or a future instruction. An object's def is an instruction that stores data in the object. Examples of an object's def include a store instruction, an instruction having a variable on the left hand side (LHS) of the instruction that points to the object, etc. The instruction does not need to overwrite the entire memory allocated to the object, but merely needs to write data into a portion of the object. The allocation of memory for an object is not an object's def (because the data in the object is not initialized). An object's use is an instruction that uses a variable that has access to the stack allocated object. Examples of an object's use include a load instruction, a binary operation involving a pointer to the object, etc.

Figure 1:
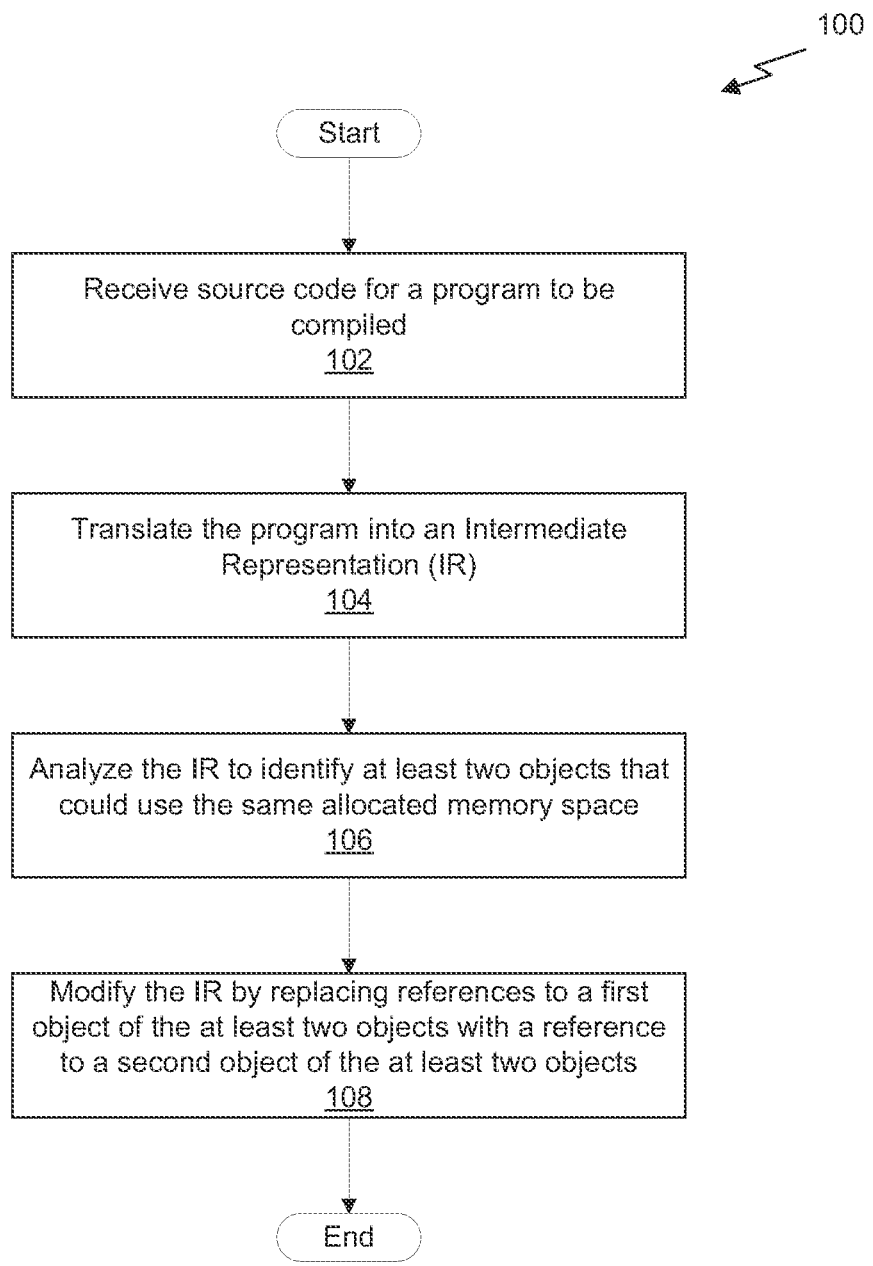
FIG. 1 illustrates a flowchart of a method for optimizing allocation of thread stack memory, in accordance with one embodiment.

FIG. 1 illustrates a flowchart of a method 100 for optimizing allocation of thread stack memory, in accordance with one embodiment. At step 102, a compiler receives a program to be compiled. The program may be written in a high-level programming language such as C++, C#(C sharp), Java, Cg (C for Graphics), or some other high-level programming language. At step 104, the compiler translates the program into an IR. The IR may be an intermediate language such as LLVM (Low Level Virtual Machine Compiler Infrastructure) assembly language, C, three-address code (TAC), or some other type of intermediate language. At step 106, the compiler analyzes the IR to identify at least two objects that could use the same allocated memory space in the thread stack memory. Generally, two objects may use the same allocated memory space if the lifetimes of the objects do not conflict. In other words, as long as the two objects aren't initialized or used at the same point in the program, the two objects could use the same allocated memory space.

At step 108, the compiler modifies the IR by replacing references to a first object of the at least two objects with a reference to a second object of the at least two objects. In one embodiment, when two stack allocated objects may be allocated to the same memory space, the compiler will replace instructions that point to the smaller object (i.e., in terms of memory size allocated to the object) with new instructions that point to the larger object. It should be noted that, while various optional features are set forth herein in connection with optimizing allocation of a thread stack memory, such features are set forth for illustrative purposes only and should not be construed as limiting in any manner.

Figure 2:
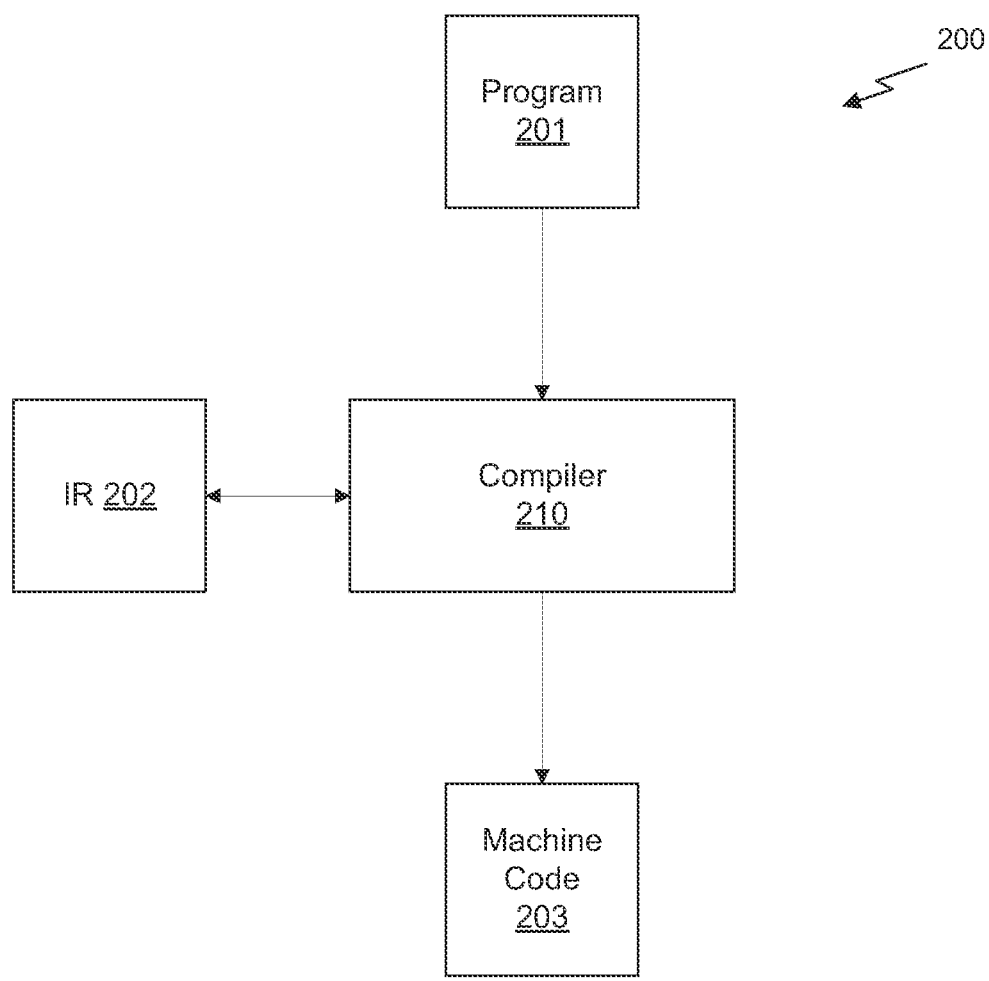
FIG. 2 illustrates a system for optimizing allocation of thread stack memory, in accordance with one embodiment.

FIG. 2 illustrates a system 200 for optimizing allocation of thread stack memory, in accordance with one embodiment. As shown in FIG. 2, the system 200 includes a compiler 210, a program 201, an intermediate representation (IR) 202, and a compiled machine code 203. The program 201, IR 202, and machine code 203 are data files stored in a memory of a computer system. The compiler 210 is a binary executable stored in a memory and configured to be executed by a processor of the computer system. The compiler 210 reads the program 201 from the memory and translates the data in the program 201 to generate the IR 202. In one embodiment, the compiler 210 is implemented as a portion of a driver for a graphics processing unit, and the program 201 is a shader program generated by an application and transmitted to the driver to be executed on the graphics processing unit.

In one embodiment, the program 201 is a text file (e.g., ASCII text) that includes a plurality of instructions in a human-readable format. The program 201 may be written in a high-level programming language such as C++. The IR 202 includes representations of the plurality of instructions from the program 201 abstracted out into a plurality of instructions in the intermediate language. For example, the intermediate language may be TAC and each instruction of the IR 202 represents one fundamental operation of the target processor (e.g., binary operations, logical operations, load/store operations, etc.). An instruction in program 201 may not be able to be executed in a single clock cycle. For example, a binary operation such a "D=A+B+C" may not be able to be executed by the processor in a single clock cycle. Therefore, in the intermediate language, the instruction set forth above may be broken down into two instructions in the intermediate language (e.g., a first instruction "T1=A+B" and a second instruction "D=T1+C").

Once the compiler 210 has generated the IR 202, the compiler performs a data-flow analysis on the IR 202. For example, the compiler 210 may rearrange the order of instructions in the IR 202. By changing the order of instructions, the compiler may be able to allocate memory in the thread stack in a more efficient way, reusing the same memory locations for different variables in the program 201. The compiler may analyze the rearranged instructions to find variables that can be assigned to the same memory object, and modify the instructions in the IR 202 such that different variables in the program 201 can reuse the same memory object in the thread stack. Once the compiler 210 has modified the IR 202 and made certain optimizations to the code, the compiler 210 compiles the IR 202 to generate the machine code 203 for execution by the processor.

FIG. 3A illustrates source code for an example program 201, in accordance with one embodiment. As shown in FIG. 3A, the program 201 is written in C++. The program 201 defines a constant N as 2000 and includes the definition of a function, g, that takes three parameters (i.e., integers n, m, and k). During every call of function g, three integer arrays (i.e., the variables A, B, and C) are declared as well as an integer value (i.e., the variable result). The variable result is initialized to 0, while the arrays A, B, and C are not immediately initialized. Array A is first used on line 11 of the program 201, which may be called a def of A. Array A is also used on line 14 of the program 201, which may be called a use of A. Array A is not used or defined after line 14 of the program 201. Similarly, array B is first used on line 18 of the program 201, array C is first used on line 21 of the program 201, and arrays B and C are used on line 24 of the program 201.

The main body of the function g comprises an If . . . Else statement. A first block (i.e., lines 10-15 of the program 201) of the If . . . Else statement is executed when parameter n is less than parameter m. A second block (i.e., lines 17-25 of the program 201) is executed when parameter n is greater than or equal to parameter m. Then, the value of the variable result is returned by the function. Examining the If . . . Else statement in more detail, one of skill in the art will notice that the array A is initialized in the first block within a first for loop (i.e., lines 10-12 of the program 201) and then a plurality of values of A are added to the variable result within a second for loop (i.e., lines 13-15 of the program 201). The array B is initialized in a third for loop (i.e., lines 17-19 of the program 201), the array C is initialized in a fourth for loop (i.e., lines 20-22 of the program 201), and then every $k^{th}$ value of B is multiplied by every $k^{th}$ value of C and added to the variable result within a fifth for loop (i.e., lines 23-25 of the program 201).

It will be appreciated that, each time function g is called by a thread, the function will execute either the first block or the second block of the If . . . Else statement, but not the first block and the second block. In other words, during execution, either the array A will be defined and used in one or more instructions, or the arrays B and C will be defined and used in one or more instructions, based on the conditional statement ("n<m"). Advantageously, the compiler may optimize the IR 202 for program 201 such that array A and either array B or array C may be allocated to the same object in the thread stack memory. In contrast, because array B and array C may be live at the same point in the program (e.g., in the fifth for loop values from both array B and C may be used as operands in the same instruction), the arrays must point to different objects in the thread stack memory. More generally, if two objects are not live at the same point in the program, then the two objects may be allocated to the same memory space having a size at least as large as the size of the larger of the two objects. In other words, a portion of the thread stack memory is allocated once and used by both objects. Since scalar values are typically allocated to registers by the compiler, objects allocated to the thread stack memory are typically arrays or aggregate values that are larger than the width of a single register.

FIG. 3B illustrates the IR 202 corresponding to the example program 201 of FIG. 3A, in accordance with one embodiment. As shown in FIG. 3B, the compiler 210 has translated program 201 into the IR 202. In lines 1 through 4, the IR 202 includes allocate instructions for the variables A, B, C, and result. The objects for the variables A, B, and C are 2000 element arrays of integers while the object for the variable result is a single integer. In line 5 of the IR 202, the value of result is initialized to 0. Line 6 of the IR 202 corresponds to the conditional statement of the main If . . . Else statement in program 201. Thus, lines 7 through 23 of the IR 202 correspond to the first block of the If . . . Else statement in the program 201 and lines 24 through 51 correspond to the second block of the If . . . Else statement in the program 201. Lines 7 through 14 of the IR 202 correspond to the first for loop in the program 201, lines 15 through 23 correspond to the second for loop in the program 201, lines 24 through 31 correspond to the third for loop in the program 201, lines 32 through 39 correspond to the fourth for loop in the program 201, and lines 40 through 51 correspond to the fifth for loop in the program 201.

FIG. 3C illustrates an IR 202-1 that is a modified version of IR 202 of FIG. 3B, in accordance with one embodiment. As shown in FIG. 3C, some of the instructions in IR 202 of FIG. 3B have been modified to optimize the allocation of the thread stack memory. Portions of the thread stack memory are allocated to a first array A, a second array B, and an integer result, which is initialized to 0. Unlike IR 202, portions of the thread stack memory are not initially allocated to the third array C. The first block of the If . . . Else statement in the IR 202-1 (i.e., lines 6 through 22) remains the same as the first block of the If . . . Else statement in IR 202 of FIG. 3B (i.e., lines 7 through 23). However, compiler 210 has modified the second block of the If . . . Else statement in IR 202-1 (i.e., lines 23 through 50) to optimize allocation of the thread stack memory. It will be appreciated that only two arrays, A and B, are allocated in the IR 202-1. Instructions that include operands that referred to array B in IR 202 have been replaced with operands that refer to array A in IR 202-1. Similarly, instructions that include operands that referred to array C in IR 202 have been replaced with operands that refer to array B in IR 202-1. Therefore, the two arrays that are allocated in the IR 202-1, A and B, correspond to arrays B and C, respectively, of the IR 202 of FIG. 3B. Thus, the amount of allocated thread stack memory for IR 202-1 is a maximum of 16 kilobytes for two 2000 element arrays in IR 202-1 as compared to 24 kilobytes for three 2000 element arrays in IR 202 (assuming the variable result is allocated to a register rather than the thread stack memory).

Figure 4:
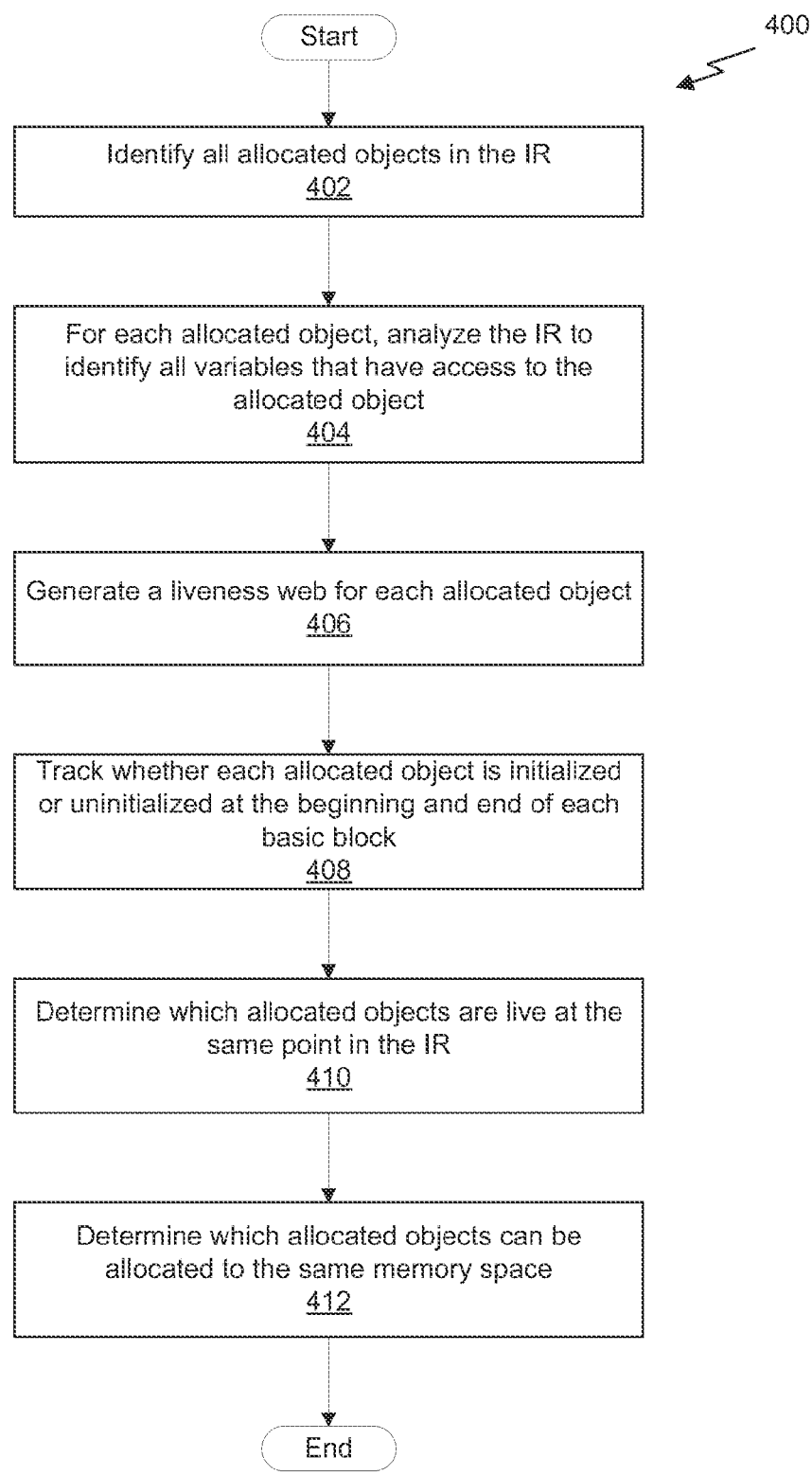
FIG. 4 illustrates a flowchart of a method for analyzing an intermediate representation to determine which objects can be allocated to the same memory space in the thread stack memory, in accordance with one embodiment.

FIG. 4 illustrates a flowchart of a method 400 for analyzing an IR 202 to determine which objects can be allocated to the same memory space in the thread stack memory, in accordance with one embodiment. At step 402, the compiler 210 identifies all stack allocated objects in the IR 202. The compiler 210 may step through each of the instructions in the IR 202 and determine whether the instruction causes memory in the thread stack to be allocated to an object. If so, the object is identified as a stack allocated object. For example, the IR 202 may include an allocate instruction (e.g., "a=alloc(int, 2000)"), which allocates a portion of the thread stack memory to an object and assigns a pointer to the object to variable a.

At step 404, for each stack allocated object, the compiler 210 analyzes the IR 202 to identify all variables that have access to the stack allocated object. In other words, as a result of an instruction, a variable that represents the left hand side (LHS) of an instruction "points to" the object if one or more variables on the right hand side (RHS) of the instruction point to the object. For example, if a handle a is copied to b, b is considered to point to the object allocated to a and, thus, should be tracked in order to determine when the memory space for a is being used. The specific instructions for which the result may point to a stack allocated object are different depending on the intermediate language utilized by the IR 202. Types of instructions that point to a stack allocated object include, but are not limited to, copy instructions, binary operations, conversions (e.g., a type cast), PHI nodes (i.e., a special instruction used to select a value depending on the predecessor of the current block), store instructions, and function calls. In one embodiment, if a variable points to any location in the memory space allocated to the object, the variable is considered to point to the entire object (i.e., not just a particular element of the object). Table 1 illustrates an example pseudocode for identifying all variables that have access to a stack allocated object:

TABLE 1

```
pointsTo (variable v, instruction inst) {
    if (RHS of inst includes v) {
        return LHS of inst;
    }
    else {
        return NULL;
    }
}
set accessVariables = {a}
set worklist = {a}
set alreadyChecked = null;
while worklist != null do
    v = worklist.pop( )
    for instr ∈ instructions(function) do
        if v == operand of instr then
            if altV = pointsTo (v, inst) then
                accessVariables = accessVariables ∪ {altV}
                if altV ! ∈ alreadyChecked then
                    worklist = worklist ∪ {altV}
                end if
            end if
        end if
    end for
end while
```

At step 406, the compiler 210 generates a liveness web for each stack allocated object. A liveness web for a stack allocated object is a collection of defs (i.e., instructions assigning a value to the object) and uses (i.e., instructions using a value stored by the object as an operand) for the stack allocated object that represent when the stack allocated object is "live" in the program flow. It will be appreciated that the allocation of memory for an object is not a def for that object. An object is "live" at a certain point in the program if the data that the object contains is potentially needed by the current instruction or by a future instruction. In one embodiment, for each stack allocated object, the compiler 210 iterates through the instructions in IR 202 and determines if the instruction is either a def or a use (or both) of the object. If the instruction is either a def or a use, then the instruction is added to the liveness web for the object. Table 2 illustrates an example pseudocode for generating the liveness web for a stack allocated object:

TABLE 2

```
struct LivenessWeb {
    set defs;
    set uses;
} livenessWeb
set accessVariables; //obtained from step 404
for instr ∈ instructions(function) do
    for v ∈ accessVariables do
        if instr == def(v) then
            livenessWeb.addDef(v);
        end if
        if instr = use(v) then
            livenessWeb.addUse(v);
        end if
    end for
end for
```

At step 408, the compiler 210 tracks whether each stack allocated object is initialized or uninitialized at the beginning and end of each basic block. In one embodiment, the compiler 210 iterates through each basic block in the IR 202 and records when defs are encountered for each stack allocated object. A basic block is a portion of code within a program that has one entry point and one exit point (i.e., whenever the first instruction in a basic block is executed, the rest of the instructions in the basic block are executed exactly once in order). For example, in IR 202 of FIG. 3B, a first basic block extends from line 1 (i.e., "A:=alloc(in, 2000)") to line 6 (i.e., "if n>=m goto L5"), a second basic block extends from line 7 (i.e., "i:=0") to line 8 (i.e., if i>=2000 goto L2"), a third basic block extends from line 9 (i.e., "t0:=i*3") to line 14 (i.e., "goto L1"), and so forth. The compiler 210 may use the liveness web for each object, which records each of the defs and uses for an object, to determine whether each basic block includes a def for the object. If an object has been initialized on any path leading to the current block, then the object is considered initialized in the current block. Table 3 illustrates an example pseudocode for tracking whether each stack allocated object is initialized or uninitialized at each basic block:

TABLE 3 set allocatedObjects; // contains all stack allocated objects
map bbToInitializedBefore; // sets of objects initialized before each block
map bbToInitializedAfter; // sets of objects initialized after each block
bool change = true
while change do
    change = false;
    for bb ∈ basicBlocks(function) do
        workset = null;
        for predBB ∈ predecessors(bb) do
            workset = workset ∪ bbToInitializedAfter(predBB);
        end for
        if workset != bbToInitializedBefore.find(bb) then
            change = true;
            bbToInitializedBefore = bbToInitializedBefore ∪ {(bb, workset)};
        end if
        for instr ∈ instructions(bb) do
            for allocatedObject ∈ allocatedObjects do
                if instr ∈ defs then
                      workset = workset ∪ {allocatedObject};
                end if
            end for
        end for
        if workset != bbToInitializedAfter.find(bb) then
            change = true;
            bbToInitializedAfter = bbToInitializedAfter ∪ {(bb, workset)};
        end if
    end for
end while At step 410, the compiler 210 determines which stack allocated objects are live at the same points in the IR 202. After obtaining the liveness webs in step 406 and tracking which objects are initialized and uninitialized at the beginning and end of each basic block in step 408, the compiler 210 maintains a set of stack allocated objects that are live at the beginning and end of each basic block. It will be appreciated that step 408 only determines when an object has been initialized (i.e., represented by the defs of the object), but, in step 410, the compiler determines when the object is no longer needed based on the object's uses. The compiler 210 updates the set of stack allocated objects that are live by iterating through the blocks and the instructions in the function in reverse order, taking into account the defs and uses for the object. If, at any point in the IR 202, two stack allocated objects are live simultaneously, the pair of objects may be marked as a conflict. Each stack allocated object may be associated with a list of the other stack allocated objects that conflict with that stack allocated object. Table 4 illustrates an example pseudocode for determining which stack allocated objects are live at the same time:

TABLE 4 set allocatedObjects; // contains all stack allocated objects
map bbToBeforeSet; // sets of objects live before each block state
map bbToInitializedBefore; // sets of objects initialized before each block
map bbToInitializedAfter; // sets of objects initialized after each block
bool change = true
while change do
    change = false;
    for bb ∈ basicBlocks(function) do
        workset = null;
        for succBB ∈ successors(bb) do
            workset = workset ∪ bbToBeforeSet(succBB);
        end for
        workset = workset ∩ bbToInitializedAfter(bb);
        for allocatedObject ∈ allocatedObjects do
            bool initialized = (allocatedObject ∈ bbToInitializedAfter(bb));
            if initialized & allocatedObject ! ∈ bbToInitializedAfter(bb) then
                initDef = first def in bb;
            end if
            for instr ∈ instructions(bb) do // in reverse order
                if (instr ∈ defs) & (initDef == instr) then
                      workset = workset –{allocatedObject};
                end if
                if (instr ∈ uses) & initialized then
                      workset = workset ∪ {allocatedObject};
                      for otherObject ∈ workset do
                          if otherObject == allocatedObject then
                              continue;
                          end if
                        allocatedObject.addConflicts(otherObject);
                        otherObject.addConflicts(allocatedObject);
                      end for
                end if
            end for
        end for
        if workset != bbToBeforeSet.find(bb) then
            change = true;
            bbToBeforeSet = bbToBeforeSet ∪ {(bb, workset)};
        end if
    end for
end while At step 412, the compiler 210 determines which objects can be allocated to the same memory space. If two objects do not conflict, then the two objects can be allocated to the same memory space. At step 412, the compiler 210 determines how many allocations are actually needed, the size of each allocation, and which objects will use each allocated space. In one embodiment, only objects of the same type and alignment are allocated to the same memory space. For example, if there are two allocated arrays of integers with an alignment 4, one array having a size of 2000 integers and the other array having a size of 3000 integers, and the two allocated arrays do not conflict, then both objects can use a single allocated space of 3000 integers. However, if the arrays are of different types, such as an array of integers and an array of doubles, or of different alignment, then the objects are not allocated to the same memory space. In another embodiment, objects of different types and alignment can be allocated to the same memory space.

In one embodiment, the larger allocations are kept and smaller allocations of the same type use the memory space allocated to the larger object. For each type of object in the IR 202, the compiler 210 sorts the stack allocated objects of that type by size, in decreasing order. A set of objects that will remain in the code is maintained. Each object maintains a pointer to the stack allocated object that is going to replace the object (if the object is replaced) and a set of stack allocated objects that will use the object's allocated memory space (if the object remains in the IR 202). The larger objects will be allocated to the thread stack memory and the rest of the objects are checked to see if they conflict with the first object or with other objects that use that memory space. If the objects do not conflict, the objects are assigned to use the same memory space, or are put in a worklist. The largest object in the worklist is then allocated to the thread stack memory and the rest of the objects in the worklist are checked to see if they conflict with the first object or with other objects that use that memory space. If the objects do not conflict, the objects are assigned to use the same memory space, or are put in a new worklist, which is again checked like the previous worklist and so forth until all of the objects are allocated to the thread stack memory space or are assigned to use the same memory space as a stack allocated object. Tables 5 and 6 illustrate example pseudocode for determining which objects can be allocated to the same memory space:

TABLE 5

```
struct allocatedObjectStruct{
    set < allocatedObjectStruct > residents; // objects using this memory
    space
    allocatedObjectStruct *home; // the object whose allocation this
    object uses
    bool decided; // marks whether this object has been decided yet
    bool isArray; // marks whether this object is an array
    unsigned size; // the size if the object is an array
    unsigned alignment; // the alignment of the object
    Type type; // the objects type
}
set < allocatedObjectStruct > allocatedObjects;
set < allocatedObjectStruct > toAllocated = null;
for allocatedObject ∈ allocatedObjects do
    if allocatedObject.decided then
        continue;
    end if
    choose(allocatedObject.type, allocatedObject.alignment);
end for
```

TABLE 6

```
void choose(Type type, unsigned alignment) {
    vector < allocatedObjectStruct > rightType;
    for allocatedObject ∈ allocatedObjects do
        if (allocatedObject.type == type) & (allocatedObject.alignment ==
            alignment) then
            rightType.insert(allocatedObject);
        end if
    end for
    if ! rightType.empty( ) then
        sort(rightType);
    end if
    set < allocatedObjectStruct > worklist;
    allocatedObjectStruct *current = null;
    repeat
        if current != null then
            repeat
                current = worklist.pop( );
            until !current.decided
            toAllocate = toAllocate ∪ {current};
            current.decided = true;
        end if
        for rightTypeObject ∈ rightType do
            if rightTypeObject.decided then
                continue;
            end if
            if current == null then
                current = rightTypeObject;
                toAllocate = toAllocate ∪ {current};
                current.decided = true;
```

TABLE 6-continued

```
                continue;
            end if
            if !current.isConflict(rightTypeObject) then
                current.addResident(rightTypeObject);
                rightTypeObject.addHome(current);
                rightTypeObject.decided = true;
            else
                worklist.push(rightTypeObject);
            end if
        end for
    until worklist.empty ( )
}
```

It will be appreciated that the framework set forth above may be implemented for a variety of different compilers. In one embodiment, the framework may be implemented in a compiler of a parallel processing unit (PPU) that generates machine code in response to a program 201 generated by an application executing on a central processing unit (CPU). The following description illustrates one such architecture that could be used to implement at least a portion of the framework set forth above.

Figure 5:
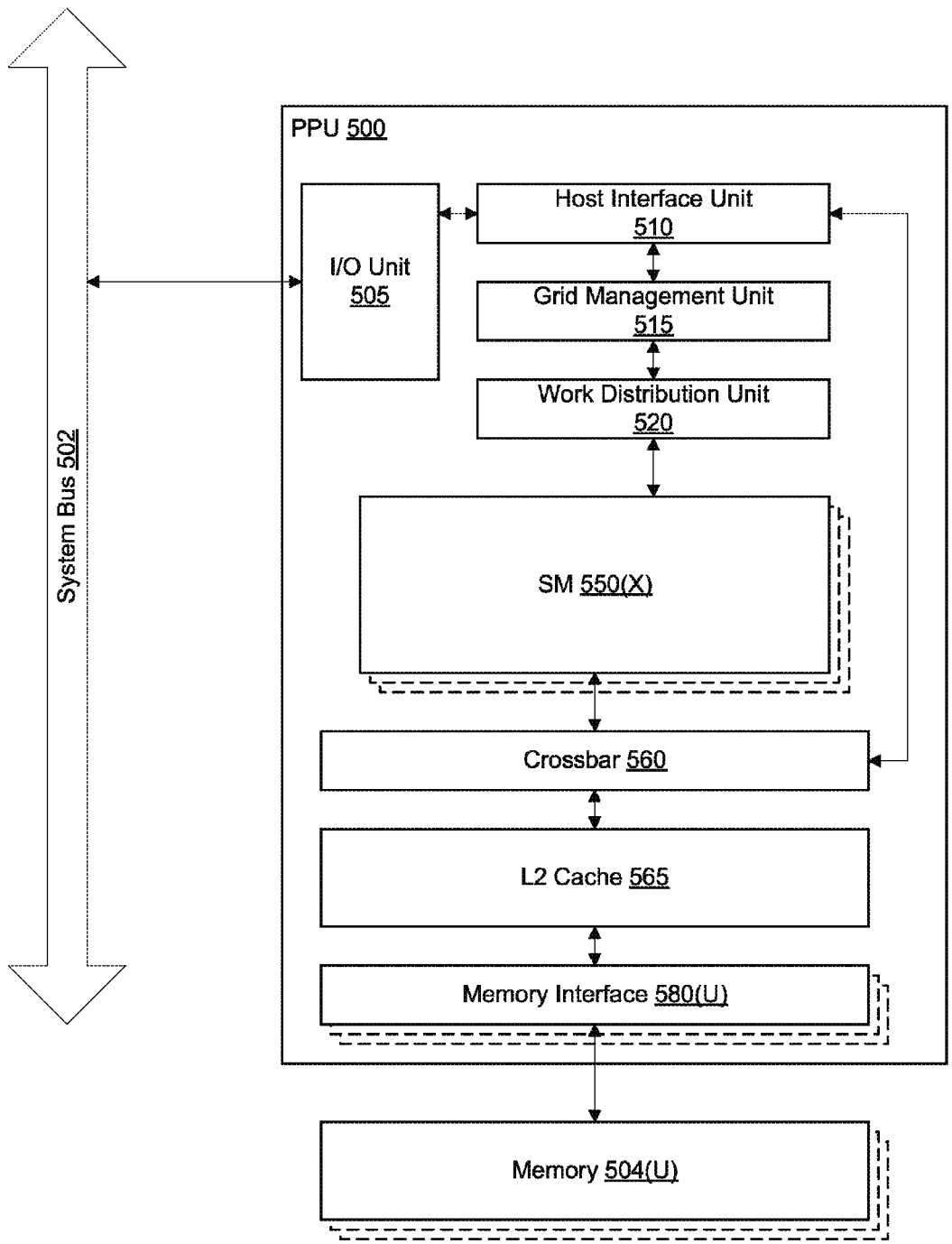
FIG. 5 illustrates a parallel processing unit, according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory. In one embodiment, the driver kernel implements a compiler that performs optimizations for thread stack memory allocation when generating threads for execution on PPU 500.

In one embodiment, the PPU 500 comprises X SMs 550 (X). For example, the PPU 100 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU), such as the GPU 340. The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

It will be appreciated that a master thread may be configured to execute on a first SM 550(0) of PPU 500. In addition, two or more child threads may be configured to execute on two or more additional SMs (e.g., 150(1), 550(2), etc.). The master thread and child threads may access motion vector data stored in a memory by a hardware video encoder 330.

Figure 6:
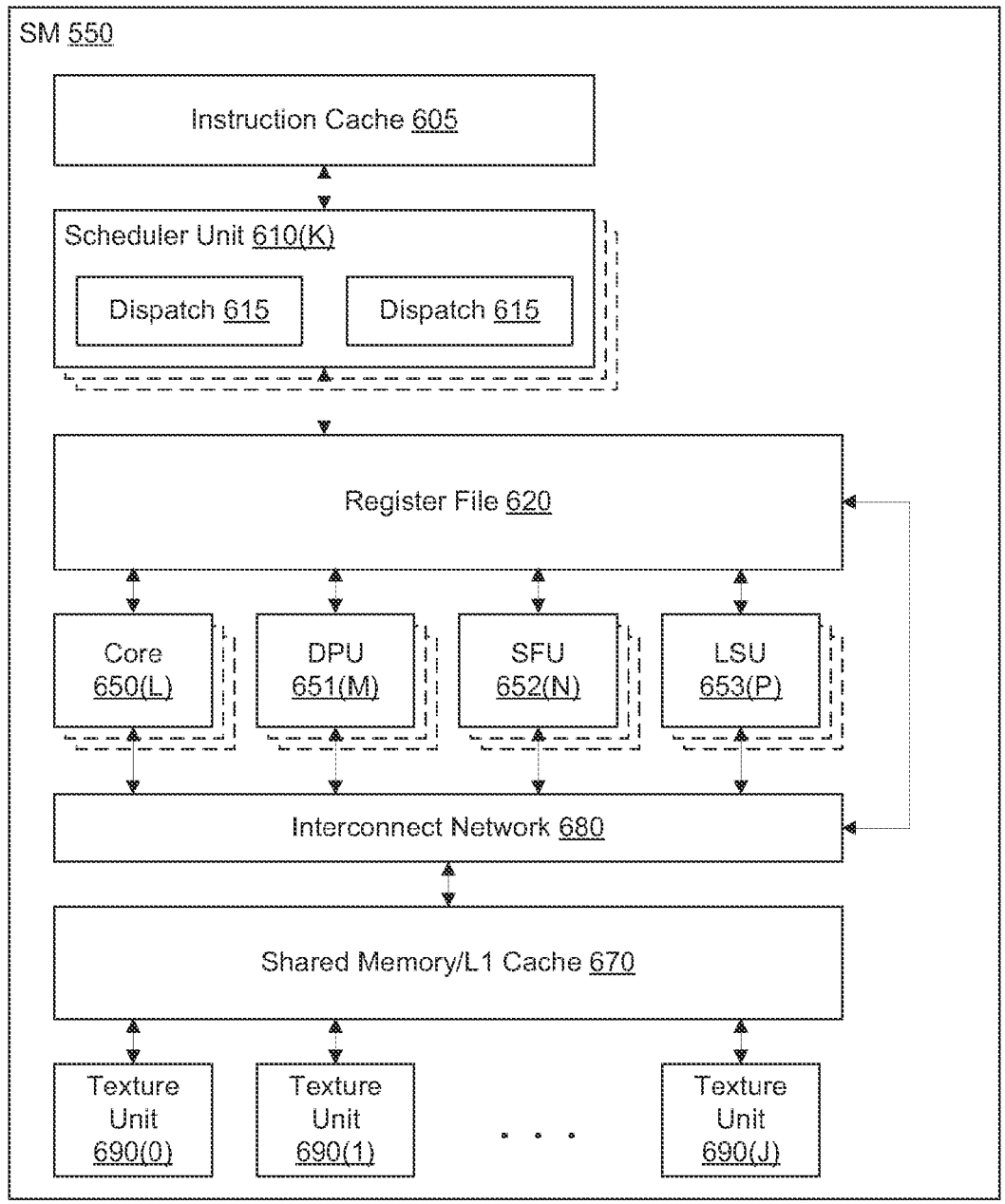
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 550 includes a register file 620 that provides a set of registers for the functional units of the SM 550. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
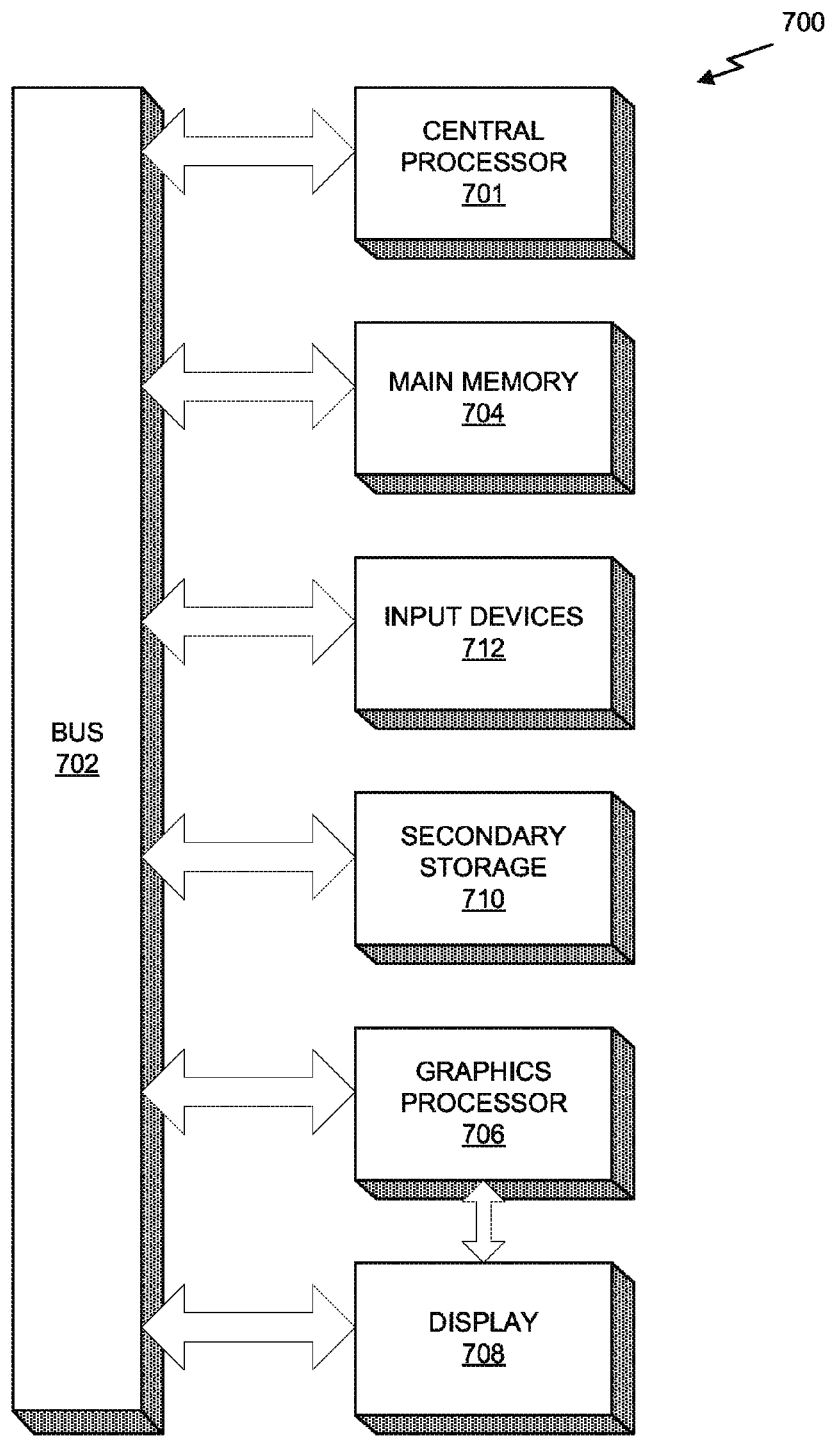
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media. Program 201, IR 202, IR 202-1, machine code 203, and compiler 210 may be stored in the main memory 704 and/or the secondary storage 710. The compiler 210 is then executed by processor 701 to generate the optimized machine code 203.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, at a processing unit, source code for a program;
   translating, by the processing unit, the source code into an intermediate representation (IR);
   analyzing, by the processing unit, the IR to identify at least two objects that could use a first allocated memory space in a thread stack memory, wherein the at least two objects comprise data structures of a plurality of sizes; and
   modifying, by the processing unit, the IR by replacing references to a first object of the at least two objects with a reference to a second object of the at least two objects, wherein the first object is smaller than the second object,
   wherein analyzing the IR comprises:
      identifying a plurality of stack allocated objects in the IR,
      for each stack allocated object in the plurality of stack allocated objects, identifying all variables that have access to the stack allocated object,
      determining which stack allocated objects are live at the same point in the IR, and
      determining which stack allocated objects can be allocated to the first allocated memory space.

2. The method of claim 1, wherein the IR comprises an LLVM (Low Level Virtual Machine Compiler Infrastructure) assembly language.

3. The method of claim 1, wherein the source code comprises a plurality of instructions specified by at least one high-level programming language of C++, Java, C#, and Cg.

4. The method of claim 1, wherein analyzing the IR further comprises generating a liveness web for each stack allocated object in the plurality of stack allocated objects.

5. A non-transitory computer-readable storage medium storing instructions that, when executed by a processor, cause the processor to perform steps comprising:
   receiving source code for a program;
   translating the source code into an intermediate representation (IR);
   analyzing the IR to identify at least two objects that could use a first allocated memory space in a thread stack memory, wherein the at least two objects comprise data structures of a plurality of sizes; and
   modifying the IR by replacing references to a first object of the at least two objects with a reference to a second object of the at least two objects, wherein the first object is smaller than the second object,
   wherein analyzing the IR comprises:
      identifying a plurality of stack allocated objects in the IR,
      for each stack allocated object in the plurality of stack allocated objects, identifying all variables that have access to the stack allocated object,
      determining which stack allocated objects are live at the same point in the IR, and
      determining which stack allocated objects can be allocated to the first allocated memory space.

6. The method of claim 1, wherein translating the source code into the IR is performed by a compiler implemented in a driver for a graphics processing unit.

7. A system, comprising:
   a memory configured to store source code for a program; and
   a processing unit configured to:
      receive the source code,
      translate the source code into an intermediate representation (IR),
      analyze the IR to identify at least two objects that could use a first allocated memory space in a thread stack memory, wherein the at least two objects comprise data structures of a plurality of sizes and
      modify the IR by replacing references to a first object of the at least two objects with a reference to a second object of the at least two objects, wherein the first object is smaller than the second object,
   wherein analyzing the IR comprises:
      identifying a plurality of stack allocated objects in the IR,
      for each stack allocated object in the plurality of stack allocated objects, identifying all variables that have access to the stack allocated object,
      determining which stack allocated objects are live at the same point in the IR, and
      determining which stack allocated objects can be allocated to the first allocated memory space.

8. The method of claim 1, further comprising:
   analyzing the IR to identify at least two additional objects that could use a second allocated memory space in the thread stack memory; and
   modifying the IR by replacing references to a first object of the at least two additional objects with a reference to a second object of the at least two additional objects.

9. The method of claim 8, wherein analyzing the IR to identify at least two additional objects comprises:
   identifying a first additional object that has a conflict with another object that uses the first allocated memory space; and
   identifying at least one additional object that has a conflict with another object that uses the first allocated memory space.

10. A non-transitory computer-readable storage medium storing instructions that, when executed by a processor, cause the processor to perform steps comprising:
    receiving a source code for a program;
    translating the source code into an intermediate representation (IR);
    analyzing the IR to identify at least two objects that could use a first allocated memory space in a thread stack memory, wherein the at least two objects comprise data structures of a plurality of sizes; and
    modifying the IR by replacing references to a first object of the at least two objects with a reference to a second object of the at least two objects, wherein the first object is smaller than the second object,
wherein analyzing the IR comprises:
identifying a plurality of stack allocated objects in the IR,
for each stack allocated object in the plurality of stack allocated objects, identifying all variables that have access to the stack allocated object,
determining which stack allocated objects are live at the same point in the IR, and
determining which stack allocated objects can be allocated to the first allocated memory space.

11. The non-transitory computer-readable storage medium of claim 10, wherein the IR comprises an LLVM (Low Level Virtual Machine Compiler Infrastructure) assembly language.

12. The non-transitory computer-readable storage medium of claim 10, wherein analyzing the IR further comprises generating a liveness web for each stack allocated object in the plurality of stack allocated objects.

13. The non-transitory computer-readable storage medium of claim 10, wherein translating the source code into the IR is performed by a compiler implemented in a driver for a graphics processing unit.

14. A system, comprising:
a memory configured to store source code for a program; and
a processing unit configured to:
receive the source code,
translate the source code into an intermediate representation (IR),
analyze the IR to identify at least two objects that could use a first allocated memory space in a thread stack memory, wherein the at least two objects comprise data structures of a plurality of sizes and
modify the IR by replacing references to a first object of the at least two objects with a reference to a second object of the at least two objects, wherein the first object is smaller than the second object,
wherein analyzing the IR comprises:
identifying a plurality of stack allocated objects in the IR,
for each stack allocated object in the plurality of stack allocated objects, identifying all variables that have access to the stack allocated object,
determining which stack allocated objects are live at the same point in the JR, and
determining which stack allocated objects can be allocated to the first allocated memory space.

15. The system of claim 14, wherein the source code comprises a shader program.

16. The system of claim 14, further comprising a graphics processing unit coupled to the processing unit and the memory.

17. The system of claim 16, further comprising a driver stored in the memory, wherein the driver implements a compiler that, when executed by the processing unit, configures the processing unit to receive the source code, translate the source code into the IR, analyze the IR, and modify the IR.

* * * * *